US008289287B2

(12) United States Patent
Yu et al.

(10) Patent No.: US 8,289,287 B2
(45) Date of Patent: Oct. 16, 2012

(54) METHOD, APPARATUS AND COMPUTER PROGRAM PRODUCT FOR PROVIDING A PERSONALIZABLE USER INTERFACE

(75) Inventors: Kun Yu, Beijing (CN); Hao Wang, Beijing (CN); Zhen Liu, Tarrytown, NY (US); Kongqiao Wang, Beijing (CN); Feng Zhao, Beijing (CN)

(73) Assignee: Nokia Corporation, Espoo (FI)

( * ) Notice: Subject to any disclaimer, the term of this patent is extended or adjusted under 35 U.S.C. 154(b) by 846 days.

(21) Appl. No.: 12/346,144

(22) Filed: Dec. 30, 2008

(65) Prior Publication Data
US 2010/0164877 A1  Jul. 1, 2010

(51) Int. Cl.
*G06F 3/041* (2006.01)
(52) U.S. Cl. ...................................... 345/173
(58) Field of Classification Search .................. None
See application file for complete search history.

(56) References Cited

U.S. PATENT DOCUMENTS

| | | | | |
|---|---|---|---|---|
| 4,972,496 | A * | 11/1990 | Sklarew | 382/187 |
| 5,012,521 | A * | 4/1991 | Endo et al. | 382/189 |
| 5,157,737 | A * | 10/1992 | Sklarew | 382/315 |
| 5,583,543 | A * | 12/1996 | Takahashi et al. | 345/173 |
| 6,456,298 | B1 * | 9/2002 | Kunimasa et al. | 345/629 |
| 6,806,869 | B2 * | 10/2004 | Yamakado | 345/179 |
| 7,986,298 | B1 * | 7/2011 | Dulaney et al. | 345/156 |
| 2003/0210331 | A1 | 11/2003 | Battles et al. | |
| 2006/0001667 | A1 * | 1/2006 | LaViola et al. | 345/473 |
| 2006/0007189 | A1 * | 1/2006 | Gaines et al. | 345/179 |
| 2006/0067577 | A1 | 3/2006 | Marggraff et al. | |
| 2007/0070038 | A1 * | 3/2007 | Hoffberg et al. | 345/156 |
| 2007/0082710 | A1 | 4/2007 | Jang | |
| 2007/0150834 | A1 | 6/2007 | Muller et al. | |
| 2008/0018591 | A1 * | 1/2008 | Pittel et al. | 345/156 |
| 2008/0058007 | A1 | 3/2008 | Kang | |
| 2008/0232690 | A1 * | 9/2008 | Saund et al. | 382/187 |
| 2008/0233957 | A1 | 9/2008 | Akama | |
| 2008/0260240 | A1 * | 10/2008 | Vukosavljevic et al. | 382/159 |
| 2008/0260252 | A1 * | 10/2008 | Borgaonkar et al. | 382/189 |
| 2009/0300492 | A1 * | 12/2009 | Venkatesan et al. | 715/702 |
| 2009/0324076 | A1 * | 12/2009 | Kolmykov-Zotov et al. | 382/170 |
| 2010/0164877 | A1 * | 7/2010 | Yu et al. | 345/173 |

FOREIGN PATENT DOCUMENTS

| | | |
|---|---|---|
| EP | 0 645 731 A1 | 3/1995 |
| JP | 63-114348 A | 5/1988 |
| JP | 6-311434 A | 11/1994 |
| JP | 2007-219794 A | 8/2007 |
| KR | 2006-0085850 | 7/2006 |
| WO | WO 98/19292 A1 | 5/1998 |
| WO | WO 2010/013974 A2 | 2/2010 |

OTHER PUBLICATIONS

Search Report and Written Opinion for International Application PCT/IB2009/007765 mailed Apr. 9, 2010.

(Continued)

*Primary Examiner* — Peter Vincent Agustin
(74) *Attorney, Agent, or Firm* — Alston & Bird LLP (57) ABSTRACT

An apparatus for providing a personalizable user interface may include a processor. The processor may be configured to receive a drawing input at a touch screen display, determine whether the drawing input corresponds to a stored graphic element that is associated with a function, and initiate the function in response to determining that the drawing input corresponds to the stored graphic element. A corresponding method and computer program product are also provided.

20 Claims, 6 Drawing Sheets

OTHER PUBLICATIONS

*Smart Sketches*, available at http://sketch.inesc.pt/, dated May 18, 2009, 2 pages.

Supplemental European Search Report for Application No. 09836141.3 dated Jul. 19, 2012.

\* cited by examiner

METHOD, APPARATUS AND COMPUTER PROGRAM PRODUCT FOR PROVIDING A PERSONALIZABLE USER INTERFACE

TECHNOLOGICAL FIELD

Embodiments of the present invention relate generally to user interface technology and, more particularly, relate to a method, apparatus, and computer program product for providing a personalizable user interface.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase convenience to users relates to improving a user's ability to effectively interface with the user's device. Accordingly, numerous user interface mechanisms have been developed to attempt to enable a user to more easily accomplish tasks or otherwise improve the user's experience in using the device. In this regard, for example, a user's experience during certain applications such as, for example, web browsing or applications that enable drawing may be enhanced by using a touch screen display as the user interface. Furthermore, some users may have a preference for use of a touch screen display for entry of user interface commands or simply creating content over other alternatives. In recognition of the utility and popularity of touch screen displays, many devices, including some mobile terminals, now employ touch screen displays. As such, touch screen devices are now relatively well known, with numerous different technologies being employed for sensing a particular point at which an object may contact the touch screen display.

Whether the user interface is a touch screen user interface, or other mechanism, one of the exciting aspects of many new devices is the opportunity to utilize and explore a new and interesting user interface. However, over time the novelty of a new user interface may wear off. Since the user interface is typically a relatively fixed aspect of each device, if the user tires of the current user interface, the user is typically forced to move on to another device with a desirable user interface.

BRIEF SUMMARY

A method, apparatus and computer program product are therefore provided to enable personalization of the user interface of a device. In particular, a method, apparatus and computer program product are provided that enable users of devices with touch screens to fully personalize the user interface of their respective devices. Moreover, the personalization may be updated, adapted and/or shared with other users.

In one exemplary embodiment, a method of providing a personalizable user interface is provided. The method may include receiving a drawing input at a touch screen display, determining whether the drawing input corresponds to a stored graphic element that is associated with a function, and initiating the function in response to determining that the drawing input corresponds to the stored graphic element.

In another exemplary embodiment, a computer program product for providing a personalizable user interface is provided. The computer program product includes at least one computer-readable storage medium having computer-executable program code instructions stored therein. The computer-executable program code instructions may include program code instructions for receiving a drawing input at a touch screen display, determining whether the drawing input corresponds to a stored graphic element that is associated with a function, and initiating the function in response to determining that the drawing input corresponds to the stored graphic element.

In another exemplary embodiment, an apparatus for providing a personalizable user interface is provided. The apparatus may include a processor configured to receive a drawing input at a touch screen display, determine whether the drawing input corresponds to a stored graphic element that is associated with a function, and initiate the function in response to determining that the drawing input corresponds to the stored graphic element.

In another exemplary embodiment, an apparatus for providing a personalizable user interface is provided. The apparatus may include means for receiving a drawing input at a touch screen display, means for determining whether the drawing input corresponds to a stored graphic element that is associated with a function, and means for initiating the function in response to determining that the drawing input corresponds to the stored graphic element.

Embodiments of the invention may provide a method, apparatus and computer program product for improving touch screen interface performance. As a result, for example, mobile terminal users may enjoy improved capabilities with respect to interfacing with services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 (which includes FIGS. 3A through 3E) shows an example of operation of the apparatus of FIG. 2 according to an exemplary embodiment of the present invention;

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

In certain environments, such as when used in connection with a mobile terminal, personalization of device settings may be important to users. In this regard, mobile terminals have become heavily relied upon by users for enabling communication with friends and colleagues, entertainment, task accomplishment, schedule management, and/or the like. As such, many users acquire devices that appeal to them and further personalize such devices by buying ringtones, accessories and applications that are interesting to the respective users. Users also tend to personalize the display and interface features to the extent possible. In this regard, for example, the user may select wallpaper, screensavers, icon size and/or arrangement, and other personalized profile and interface settings. However, most such selections are based on selectable options that are possible within a limited set of predefined options that are available for download or local implementation. For example, icons, menus, service inquiry formats and other user interface elements are typically predefined in the factory of the producer of each device.

Some embodiments of the present invention, on the other hand, provide for full customization of the user interface for touch screen devices. As such, some embodiments of the present invention may improve touch screen interface performance by providing a user with the ability to define functions that are associated with drawings or other user inputs for execution when such drawings or user inputs are recognized. Based on the user having the ability to continually change the user interface to the user's own liking, the user may not be likely to tire of the user interface. Furthermore, since some embodiments of the present invention enable sharing of personalized user interface information among users, users may find it interesting to try out, adopt and/or adapt the personalized user interface settings developed by other users.

Figure 1:
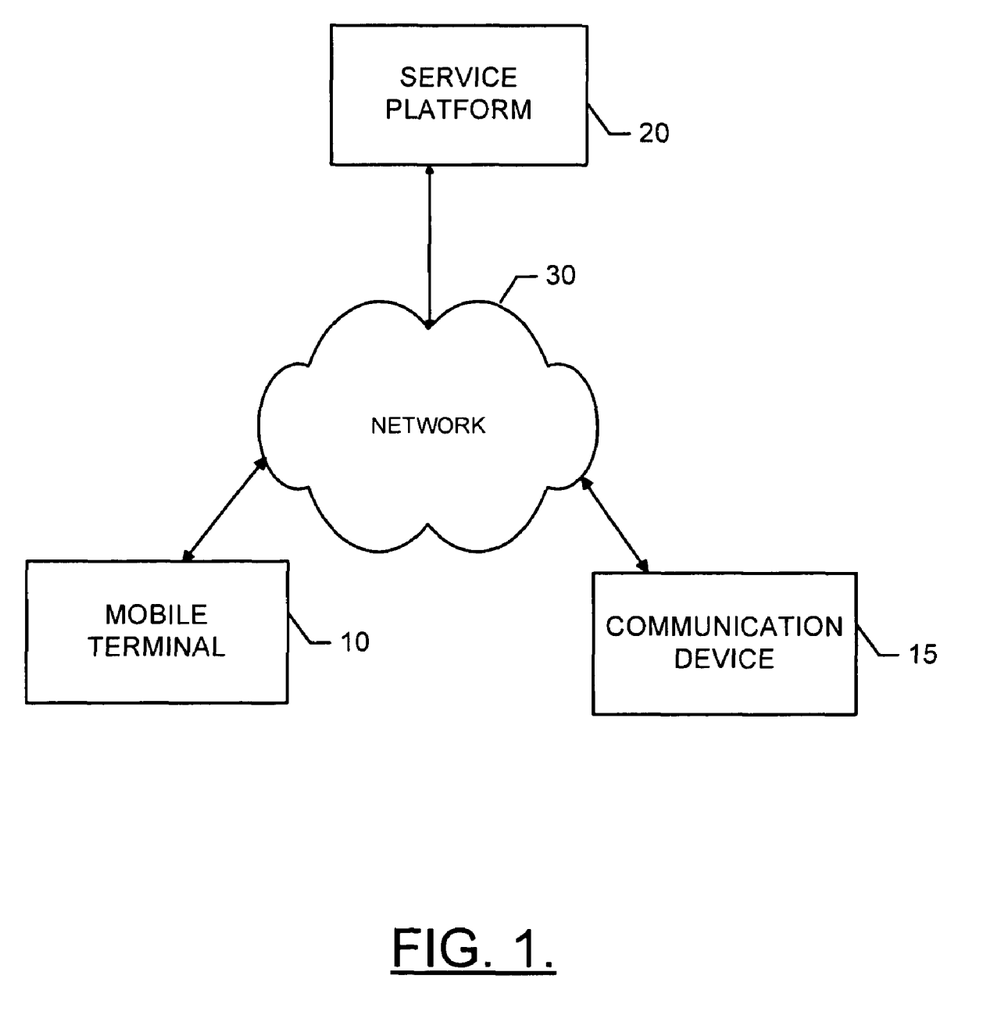
FIG. 1 is a schematic block diagram of a system according to an exemplary embodiment of the present invention.

FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. As shown in FIG. 1, an embodiment of a system in accordance with an example embodiment of the present invention may include a mobile terminal 10 capable of communication with numerous other devices including, for example, a service platform 20 via a network 30. In some embodiments of the present invention, the system may further include one or more additional communication devices (e.g., communication device 15) such as other mobile terminals, personal computers (PCs), servers, network hard disks, file storage servers, and/or the like, that are capable of communication with the mobile terminal 10 and accessible by the service platform 20. However, not all systems that employ embodiments of the present invention may comprise all the devices illustrated and/or described herein. Moreover, in some cases, embodiments may be practiced on a standalone device independent of any system.

The mobile terminal 10 may be any of multiple types of mobile communication and/or computing devices such as, for example, portable digital assistants (PDAs), pagers, mobile televisions, mobile telephones, gaming devices, laptop computers, cameras, camera phones, video recorders, audio/video players, radios, global positioning system (GPS) devices, or any combination of the aforementioned, and other types of voice and text communications systems. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30.

Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the mobile terminal 10 and the other devices (e.g., service platform 20, or other mobile terminals or devices such as the communication device 15) to the network 30, the mobile terminal 10 and/or the other devices may be enabled to communicate with each other, for example, according to numerous communication protocols, to thereby carry out various communication or other functions of the mobile terminal 10 and the other devices, respectively. As such, the mobile terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi (Wireless Fidelity), ultra-wide band (UWB), Wibree techniques and/or the like and fixed access mechanisms such as digital subscriber line (DSL), cable modems, Ethernet and/or the like.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., a service associated with sharing user interface settings), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

In an exemplary embodiment, the mobile terminal 10 may employ an apparatus (e.g., the apparatus of FIG. 2) capable of employing embodiments of the present invention. Moreover, the communication device 15 may also implement embodiments of the present invention. In some cases, the mobile terminal 10 may provide information to the service platform 20 defining user interface personalization information that may be shared with other users (e.g., the user of the communication device 15). However, in some other cases, the mobile terminal 10 may directly provide user interface personalization information to the communication device 15 via the network 30.

Figure 2:
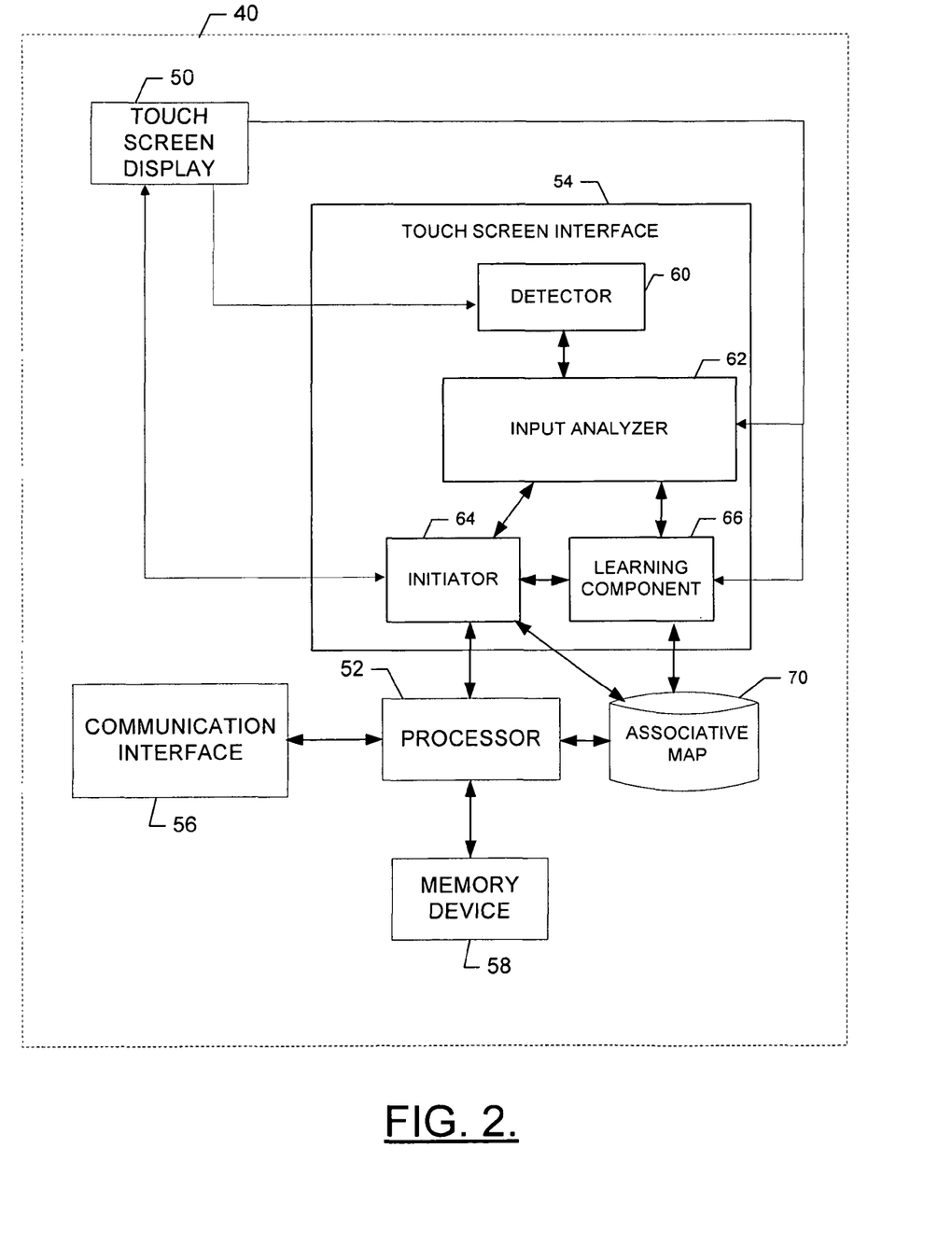
FIG. 2 is a schematic block diagram of an apparatus for providing a personalizable user interface according to an exemplary embodiment of the present invention.

FIG. 2 illustrates a block diagram of an apparatus that may benefit from embodiments of the present invention. It should be understood, however, that the apparatus as illustrated and hereinafter described is merely illustrative of one apparatus that may benefit from embodiments of the present invention and, therefore, should not be taken to limit the scope of embodiments of the present invention. In one exemplary embodiment, the apparatus of FIG. 2 may be employed on a mobile terminal (e.g., mobile terminal 10) capable of communication with other devices via a network. However, in some cases, the apparatus on which embodiments of the present invention are practiced may be a fixed terminal and/or a terminal that does not communicate with other devices. As such, not all systems that may employ embodiments of the present invention are described herein. Moreover, other structures for apparatuses employing embodiments of the present invention may also be provided and such structures may include more or less components than those shown in FIG. 2. Thus, some embodiments may comprise more or less than all the devices illustrated and/or described herein. Furthermore, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, an apparatus 40 for employing a personalizable user interface is provided. The apparatus 40 may include or otherwise be in communication with a touch screen display 50, a processor 52, a touch screen interface 54, a communication interface 56 and a memory device 58. The memory device 58 may include, for example, volatile and/or non-volatile memory. The memory device 58 may be configured to store information, data, applications, instructions or the like for enabling the apparatus to carry out various functions in accordance with exemplary embodiments of the present invention. For example, the memory device 58 could be configured to buffer input data for processing by the processor 52. Additionally or alternatively, the memory device 58 could be configured to store instructions for execution by the processor 52. As yet another alternative, the memory device 58 may be one of a plurality of databases or storage locations that store information and/or media content.

The processor 52 may be embodied in a number of different ways. For example, the processor 52 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 52 may be configured to execute instructions stored in the memory device 58 or otherwise accessible to the processor 52. As such, whether configured by hardware or software methods, or by a combination thereof, the processor 52 may represent an entity capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52, which may otherwise be a general purpose processing element if not for the specific configuration provided by the instructions, to perform the algorithms and operations described herein. However, in some cases, the processor 52 may be a processor of a specific device (e.g., a mobile terminal) adapted for employing embodiments of the present invention by further configuration of the processor 52 by instructions for performing the algorithms and operations described herein.

Meanwhile, the communication interface 56 may be any means such as a device or circuitry embodied in either hardware, software, or a combination of hardware and software that is configured to receive and/or transmit data from/to a network and/or any other device or module in communication with the apparatus 40. In this regard, the communication interface 56 may include, for example, an antenna (or multiple antennas) and supporting hardware and/or software for enabling communications with a wireless communication network. In fixed environments, the communication interface 56 may alternatively or also support wired communication. As such, the communication interface 56 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 56 may include hardware and/or software for supporting communication mechanisms such as Bluetooth, Infrared, ultra-wideband (UWB), WiFi, and/or the like.

The touch screen display 50 may be embodied as any known touch screen display. Thus, for example, the touch screen display 50 could be configured to enable touch recognition by any suitable technique, such as resistive, capacitive, infrared, strain gauge, surface wave, optical imaging, dispersive signal technology, acoustic pulse recognition, or other like techniques. The touch screen interface 54 may be in communication with the touch screen display 50 to receive indications of user inputs at the touch screen display 50 and to modify a response to such indications based on corresponding user actions that may be inferred or otherwise determined responsive to the indications. In this regard, the touch screen interface 54 may be any device or means embodied in either hardware, software, or a combination of hardware and software configured to perform the respective functions associated with the touch screen interface 54 as described below. In an exemplary embodiment, the touch screen interface 54 may be embodied in software as instructions that are stored in the memory device 58 and executed by the processor 52. Alternatively, touch screen interface 54 may be embodied as the processor 52 configured to perform the functions of the touch screen interface 54.

The touch screen interface 54 may be configured to receive an indication of an input in the form of a touch event at the touch screen display 50. Following recognition of the touch event, the touch screen interface 54 may be configured to thereafter determine a stroke event or other input gesture and provide a corresponding indication on the touch screen display 50 based on the stroke event. In this regard, for example, the touch screen interface 54 may include a detector 60 to receive indications of user inputs in order to recognize and/or determine a touch event based on each input received at the detector 60.

A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of touch screen display 50 above a particular pressure threshold over a given area. Subsequent to each touch event, the touch screen interface 54 (e.g., via the detector 60) may be further configured to recognize and/or determine a corresponding stroke event or other drawn input. A stroke event (which may be an example of a drawn input) may be defined as a touch event followed immediately by motion of the object initiating the touch event while the object remains in contact with the touch screen display 50. In other words, the stroke event may be defined by motion following a touch event thereby forming a continuous, moving touch event defining a moving series of instantaneous touch positions. The stroke event may represent a series of unbroken touch events, or in some cases a combination of separate touch events. In some cases, a drawn input may include one or multiple stroke events and/or touch events forming a character, drawing or other graphic element. For purposes of the description above, the term immediately should not necessarily be understood to correspond to a temporal limitation. Rather, the term immediately, while it may generally correspond to a relatively short time after the touch event in many instances, instead is indicative of no intervening actions between the touch event and the motion of the object defining the touch positions while such object remains in contact with the touch screen display 50. However, in some instances in which a touch event that is held for a threshold period of time triggers a corresponding function, the term immediately may also have a temporal component associated in that the motion of the object causing the touch event must occur before the expiration of the threshold period of time.

In an exemplary embodiment, the detector 60 may be configured to communicate detection information regarding the recognition or detection of a stroke event or drawn input to an input analyzer 62. In some embodiments, the input analyzer 62 (along with the detector 60) may be a portion of the touch screen interface 54. Furthermore, the input analyzer 62 and the detector 60 may each be embodied as any means such as a device or circuitry embodied in hardware, software or a combination of hardware and software that is configured to perform corresponding functions of the input analyzer 62 and the detector 60, respectively.

In this regard, for example, the input analyzer 62 may be configured to compare a drawn input or stroke event to various profiles of previously received drawn inputs and/or stroke events (e.g., graphic elements) in order to determine whether a particular input gesture or stroke event corresponds to a known or previously received input gesture or stroke event. If a correspondence is determined, the input analyzer 62 may identify the recognized or determined drawn input or stroke event to an initiator 64, which may initiate the corresponding application or service associated with the identified drawn input or stroke event. In some embodiments, the input analyzer 62 is configured to determine stroke or line orientations (e.g., vertical, horizontal, diagonal, etc.) and various other stroke characteristics such as length, curvature, shape, and/or the like. The determined characteristics may be compared to characteristics of other graphic elements either of this user or generic in nature, to determine or identify a particular drawn input or stroke event based on similarity to known drawn inputs or graphic elements.

In some embodiments, the input analyzer 62 may include or otherwise be in communication with a learning component 66. The learning component 66 may be any means such as a device or circuitry embodied in hardware, software or a combination of hardware and software that is configured to perform corresponding functions of the learning component 66 as described herein. In this regard, the learning component 66 may be configured to utilize supervised or unsupervised learning techniques to enable association of particular drawn inputs with corresponding functions or services. When such associations are made, the associations may be stored in an associative map 70. The associative map 70 may be stored in the memory device 58 or any other location accessible to the processor 52. The associative map 70 may provide a mapping or other mechanism for associating a particular drawing or graphic element with a corresponding function or service. As such, for example, whether in response to user input (e.g., via supervised learning) or an independent determination made by the learning component 66 (e.g., via unsupervised learning), the learning component 66 may be configured to provide associations between a drawn input and a function or service.

In some embodiments, supervised learning may be adopted for classification of sketches or drawing inputs provided by users. To implement supervised learning, a set of pre-defined shortcuts of functions may be used as a basis for training (e.g., a training set). In practice, the training set may be built by adding sketch-function pairs by a user (or users) and carrying out statistical training. Further input from users, such as inputs selecting functions to be associated with particular drawing inputs or sketches from among candidate functions, may be further used to train drawing classifiers that may form a part of or be embodied as the learning component 66. Accordingly, the classifiers may be incrementally trained during usage of the system to gradually increase classification accuracy.

In some embodiments, unsupervised learning may be used to handle non-labeled sketch samples based on the context of usage. In this regard, unclassified sketches or drawing inputs (e.g., due to deviation from existing or known patterns above a threshold amount) may be recorded and unsupervised training may be performed for clustering unclassified samples based on similarity. Clustered samples may form one or more new classes, and may be presented to the user as recommendations of new mapping functions. In other words, habits associated with a user's drawings may be learned over time and similarity among some drawing samples may be used to suggest new patterns that can be used as shortcuts to functions. As an example, if an unsupervised learning system identifies that for many unclassified samples, there exists some common components such as a semicircle feature and a triangle feature, the system may propose a mean-shape of the patterns and recommend that the mean-shape be used to associate with a function.

In an exemplary embodiment, in response to the input analyzer 62 not being able to recognize a particular drawn input, the learning component 66 may analyze the drawn input to determine one or more function candidates to present to the user for association with the drawn input. As an example, the learning component 66 may compare the drawn input to other known drawn inputs or graphic elements that may be similar, or may compare the drawn input to other stored template drawings that may have one or more generic associations associated therewith.

FIG. 3 illustrates an example of operation of an exemplary embodiment along these lines. In this regard, FIG. 3A shows a first drawn input 80 that may be entered into a touch screen display by a user. The first drawn input 80 may be analyzed by the input analyzer 62. In response to the input analyzer 62 not recognizing the first drawn input 80 (e.g., by failure of the first drawn input 80 to correlate with any stored graphic element with respect to a threshold amount), the learning component 66 may be engaged to provide one or more candidate functions 82 (in this case four candidate functions). The learning component 66 may analyze the first drawn input 80, which appears generally to show a book or pages including some text. Based on the analysis of the first drawn input 80, which may include information indicative of applications or services that may be related to text input or some form of book, the learning component 66 may generate the candidate functions 82 as shown in FIG. 3B. In some instances, the candidate functions 82 may also be generated in consideration of associations already made for other drawn inputs. For example, although a word processing application may seem a reasonably probable association to make with the first drawn input 80, the word processing application may already have an association with another drawn input. Accordingly, the learning component 66 may ignore the word processing application as a possible function to associate with the first drawn input 80 since the word processing application is already assigned to another association. In some cases, the user may initially select a function and then create a drawing to be associated with the drawing created. As such, the learning component 66 may incorporate direct learning by the user making direct associations between a function and drawing as the drawing is being created.

Figure 3A:
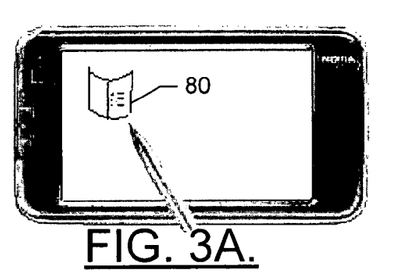
Figure 3B:
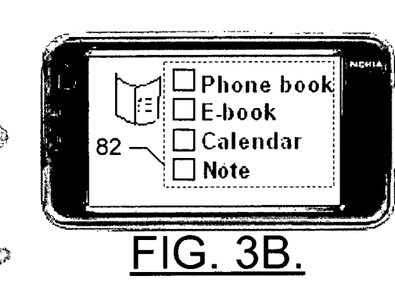
Figure 3C:
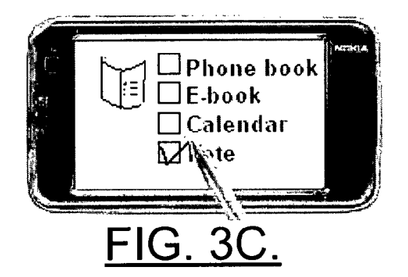
Figure 3D:
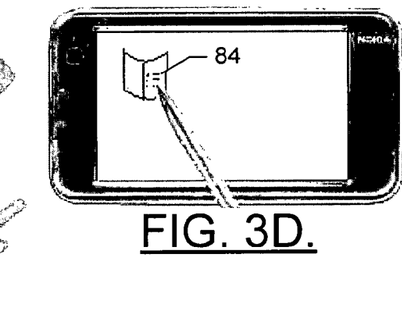
Figure 3E:
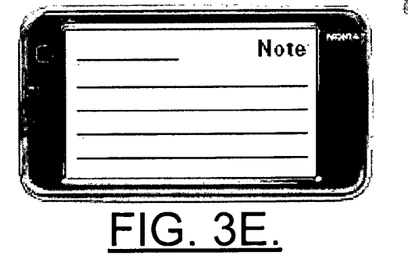

As shown in FIG. 3C, in response to reviewing the candidate functions 82, the user may select one of the candidate functions 82 (e.g., note in this example) as the function to be associated with the first drawn input 80. The association made may then be stored in the associative map 70 for future reference. In this regard, a graphic element corresponding to the first drawing input 80 may be stored in association with the corresponding function associated with the graphic element. Accordingly, if a second drawn input 84 like the one shown in FIG. 3D is received in the future, and the second drawn input 84 is recognized by the input analyzer 62 as corresponding to the graphic element stored based on the first drawn input 80, the initiator 64 may be triggered to execute or otherwise initiate the application or service (in this example, the notepad of FIG. 3E) associated with the first drawn input 80. As shown in FIG. 3E, the notepad may be opened and provided to the user for manipulation that may occur in line with manipulation that may be enabled by alternative methods of initiating the corresponding application.

Notably, although the second drawn input 84 may appear to be identical to the first drawn input 80 in terms of size, shape, location and features, the input analyzer 62 may be configured to provide for correlation of input drawings to existing or previously stored input drawings with a threshold amount of similarity therebetween. In some examples, user settings may define preferences for the threshold amount of similarity in order to enable the user to provide for either relatively strict or relatively relaxed criteria for determining correlation between a drawn input and a known drawing stored in the associative map 70. Thus, for example, features such as size, location and other characteristics may have varying levels of correspondence between them that may trigger recognition of a drawn input. In some cases, if a drawn input is sufficiently close to a graphic element stored in the associative map 70 as determined by the input analyzer 62, the corresponding function associated with the graphic element stored in the associative map 70 may be executed. However, if the drawn input is somewhat close to one or more graphic elements stored, the functions or services associated with the somewhat close graphic elements may be presented as candidate functions from which the user may select. Alternatively, other mechanisms (alone or in combination) may be utilized to determine which candidate functions to present to the user.

In some embodiments, in addition to or as an alternative to initiating a function associated with a particular drawing in response to recognition of the drawing, or user selection of a candidate function presented in response to analysis of the drawing, the user may initiate (e.g., via the initiator 64) a function associated with a particular graphic element in response to selection of the graphic element. In other words, in some cases, a drawing input may be associated with a particular function or service and such association may be stored in the associative map 70. A graphic element associated with the drawing input may then be presented on the display (e.g., similar to an icon) and in response to selection of the graphic element, the corresponding function or service associated with the graphic element in the associative map 70 may be initiated. The user may be enabled to define the overall layout in any desirable fashion. Thus, the graphic elements or icons created by the user may have any desired size, positioning, ordering, or other characteristics that may enable the user to be free of the constraints of a normal grid interface.

The initiator 64 may be any means such as a device or circuitry embodied in hardware, software or a combination of hardware and software that is configured to execute or initiate a function or service based on the input received. In this regard, for example, based on a recognized drawing input, the initiator 64 may be configured to reference the associative map 70 and execute or initiate the function associated with the graphic element that corresponds to the recognized drawing input. Alternatively or additionally, the initiator 64 may be configured to initiate or execute a function selected by a user to form an association between a drawing input and the initiated or executed function presented as a candidate function. As yet another alternative or additional capability, the initiator 64 may be configured to initiate or execute a function or service associated with a displayed graphic element in response to selection of the displayed graphic element. In some examples, initiation of a function or service may involve launching a corresponding application, accessing a website, accessing information, executing a task, making a call, or numerous other functions.

Figure 4:
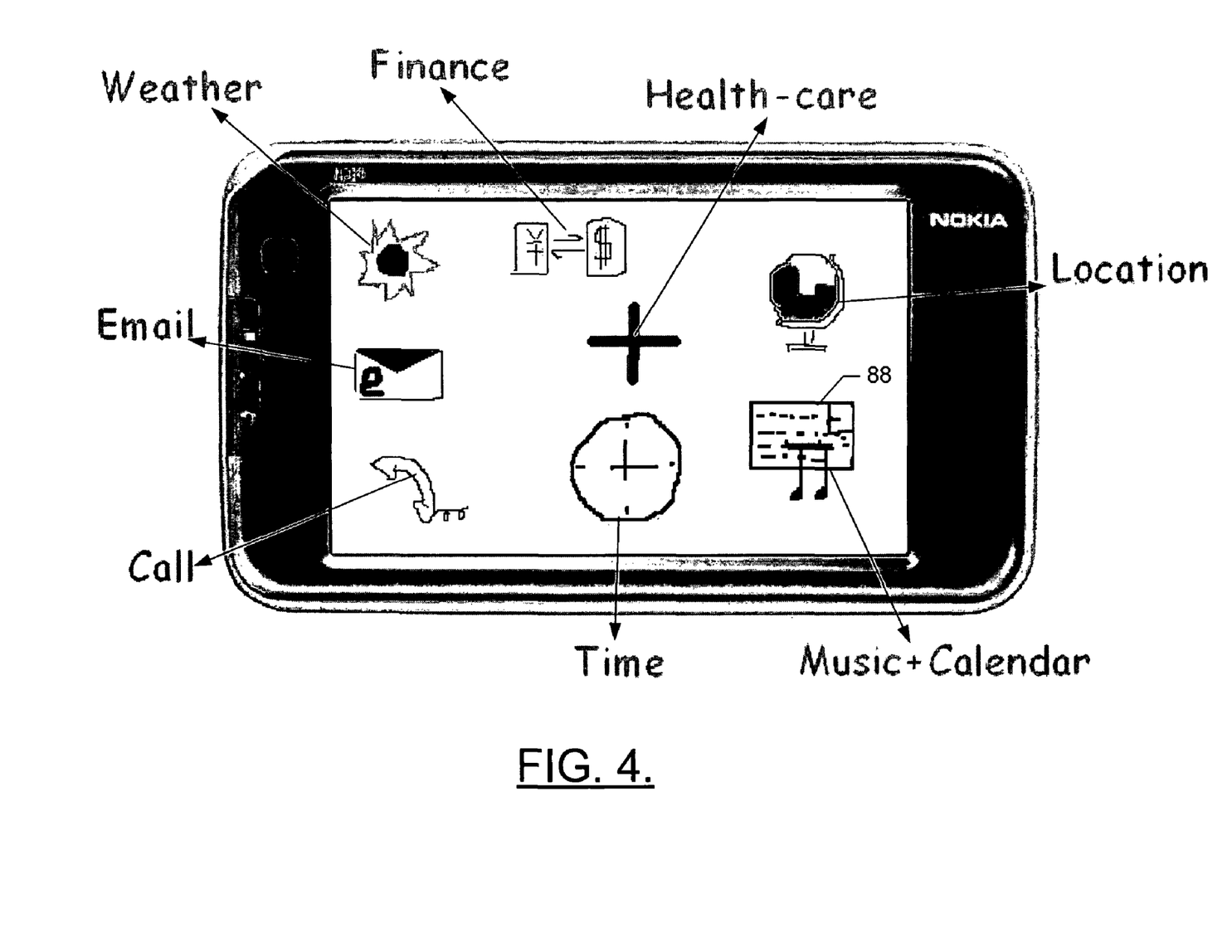
FIG. 4 shows examples of graphic elements that may be provided by the user for association with particular functions according to an exemplary embodiment of the present invention.

FIG. 4 shows an example of a display with several graphic elements displayed, the selection of any of which may initiate a corresponding function associated with each graphic element. For exemplary purposes, the exemplary graphic elements in FIG. 3 are each displayed with an arrow indicating the corresponding function associated with each graphic element. Accordingly, the graphic elements of FIG. 4 may act as selectable icons, the selection of any of which will initiate the corresponding function or service that is associated with the selected graphic element.

Figure 5:
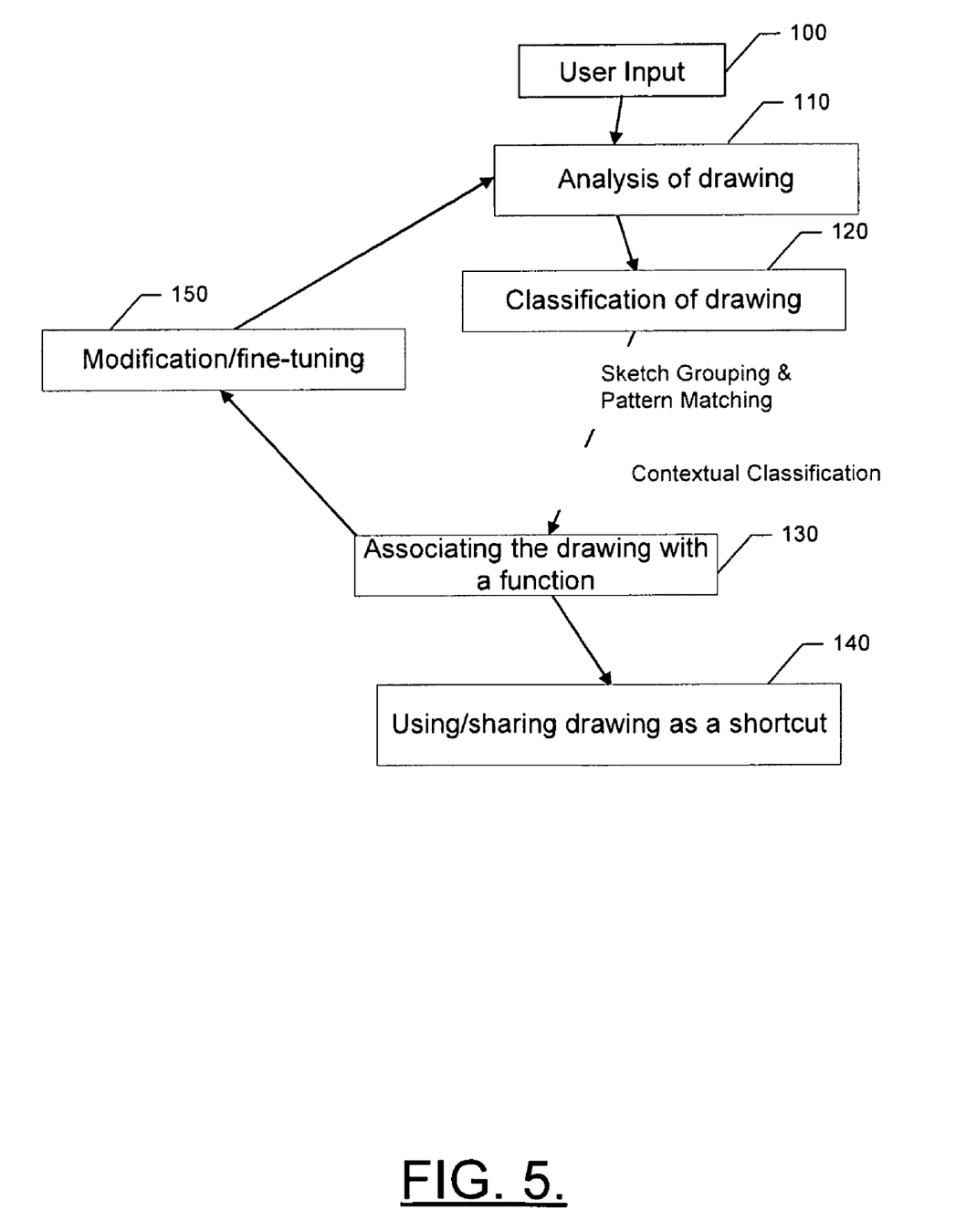
FIG. 5 illustrates a flow diagram of an example operation of an exemplary embodiment of the present invention.

FIG. 5 illustrates a block diagram of workflow according to an exemplary embodiment of the present invention. In this regard, in response to a user input at operation 100, which may define a touch event or a stroke event, the detector 60 may detect an input. When the input is recognized as a drawing input, analysis of the drawing may be initiated at operation 110. The drawing input may be classified at operation 120. In some embodiments, drawing input classification may be accomplished based on sketch grouping, pattern matching and/or contextual classification. In relation to context classification, various factors defining user context such as location, time, applications open, operational history, devices proximately located, current calendar events, and other factors may be used for each analyzed drawing to assist in either recognizing a drawing input, determining candidate functions to present for potential association with a drawing input, and/or learning user habits to enable unsupervised learning to provide improved accuracy in drawing analysis over time. In general, drawing classification may utilize pattern recognition technologies and/or sketch classification technologies to assist in classifying each drawing input. Classification of the drawing input may then be utilized in connection with associating the drawing with a function at operation 130. Function association may, in some case require user input, as described above. However, in other cases, associations may be made in response to learning done by the learning component 66. At operation 140, a defined association may be used as a shortcut to initiation of the corresponding function or may be shared with other users (e.g., via the network 30, by storing such associations with the service platform 20 which may be accessible to other users, or by sending such associations directly to other users such as the user of the communication device 15). However, if desired, drawing modification or fine tuning may be accomplished at operation 150 in order to improve the quality of the drawing or modify the association between the drawing and a corresponding function.

Modifications to associations may take numerous forms. In this regard, in some cases, user input to the learning component 66 may be used to directly alter associations of the associative map 70, for example, by replacing a prior function associated with a new function. However, in some instances, a plurality of functions may be associated with the same graphic element. Moreover, some such functions may be irrelevant or otherwise unrelated. As an example of a modification that may be accomplished, a user may provide a drawing input to be stored as a graphic element or icon for association with a music player. Later, the user may provide a drawing input to be stored as a graphic element or icon for association with a calendar. The user may modify these icons by dragging and dropping either one of the icons on top of the other icon to create a compound icon (e.g., compound music/calendar icon 88 of FIG. 4) with combined functions. Thus, by selecting the compound icon, both the music player and the calendar may be initiated (e.g., by the initiator 64) so that the user may be enabled to listen to music and check the user's schedule with a single selection of the compound icon. The user may then, at any time, make modifications to the drawing associated with the compound icon.

Accordingly, some embodiments of the present invention enable linking of a sketch or drawing to a function and presentation of the drawing as a shortcut to the function in a personalized interface. Searching for a specific function may be made easier when the function is associated with a drawing made by the user. Some embodiments also enable creation of a map or other associative mechanism to associate drawings with their respective functions. As such, in some instances, compound icons may be generated and associated with a plurality of functions. Some embodiments of the present invention enable the user to change the layout of the display freely by providing either a grid of sketches or drawings acting as icons or a collection of graphic elements with various shapes, sizes, colors, locations, presence updates, and/or the like. The user is enabled to share his or her personalization information with other users, or receive and adapt personalization information from others. Moreover, in some embodiments, the user may be enabled to draw sketches to randomly determine functions that may be associated with the sketches drawn. The user may thereafter conduct trial and modifications using a combination of supervised and unsupervised learning techniques in order to produce a useful and desirable personalized user interface.

Accordingly, some embodiments of the present invention provide a mechanism for enabling (e.g., via a processor configured to operate as described herein) a transformation of a physical touch event, represented on a display as a trace of pixels corresponding to movement of a writing implement, into a corresponding drawing that may have a predefined association with a particular function or may be associated with a particular function. As such, in at least one embodiment, a physical input forming a drawing may be transformed into a functional element or may be transformed into action corresponding to a function defined for a predefined functional element associated with the drawing.

Figure 6:
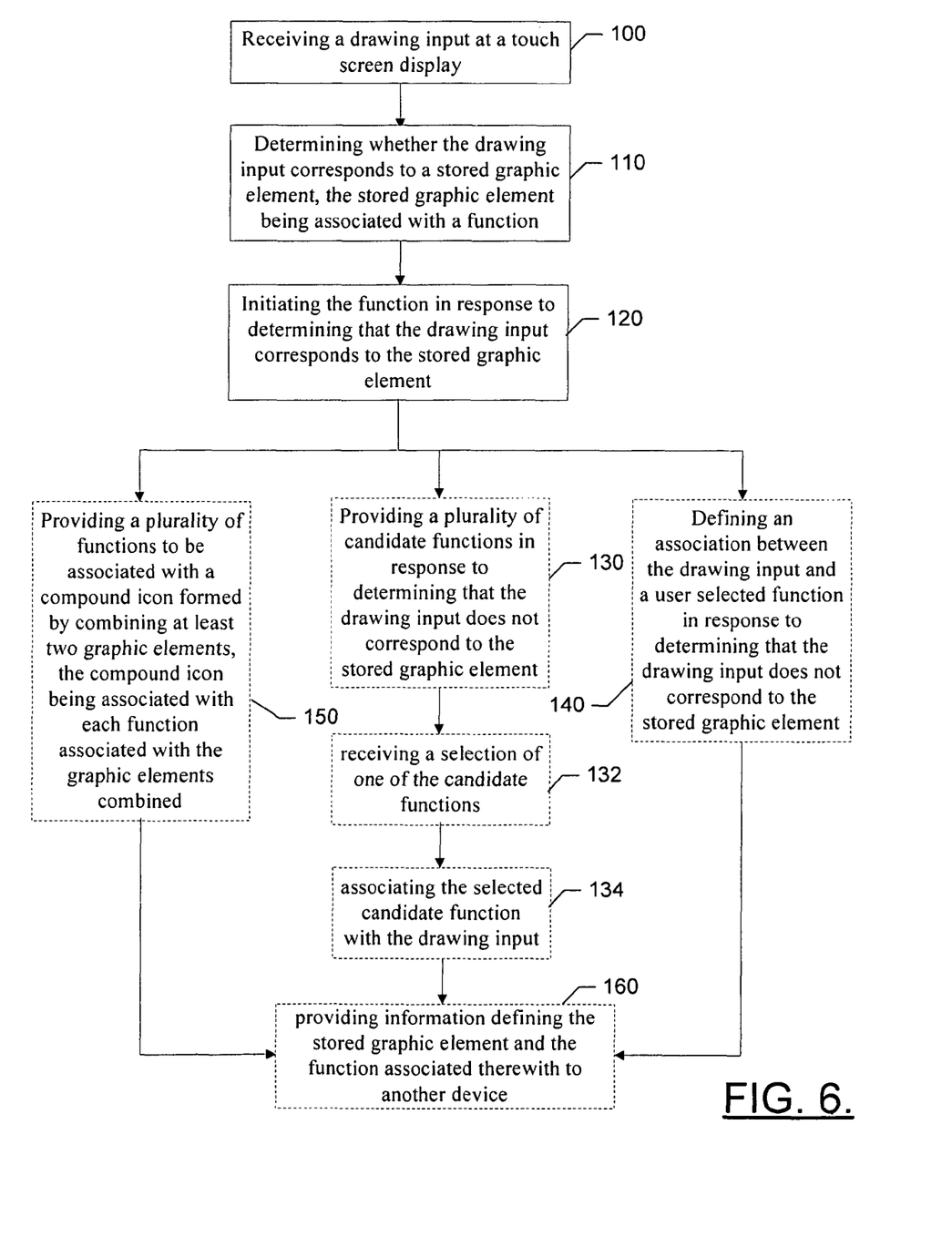
FIG. 6 is a block diagram according to an exemplary method for providing a personalizable user interface according to an exemplary embodiment of the present invention.

FIG. 6 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device (e.g., memory device 58) and executed by a processor (e.g., the processor 52). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing a personalizable user interface as provided in FIG. 6 may include receiving a drawing input at a touch screen display at operation 100 and determining whether the drawing input corresponds to a stored graphic element at operation 110. The stored graphic element may be associated with a function. The method may further include initiating the function in response to determining that the drawing input corresponds to the stored graphic element at operation 120.

In some embodiments, the method may include further optional operations, an example of which is shown in dashed lines in FIG. 6. Optional operations may be performed in any order and/or in combination with each other in various alternative embodiments. As such, the method may further include providing a plurality of candidate functions in response to determining that the drawing input does not correspond to the stored graphic element at operation 130. In some cases, the method may further include receiving a selection of one of the candidate functions at operation 132 and associating the selected candidate function with the drawing input at operation 134 to enable execution of the selected candidate function in response to a future recognition of a drawing corresponding to a graphic element stored matching the drawing input. In some cases, the method may include defining an association between the drawing input and a user selected function in response to determining that the drawing input does not correspond to the stored graphic element at operation 140. Alternatively or additionally, the method may include providing a plurality of functions to be associated with a compound icon formed by combining at least two graphic elements at operation 150. The compound icon may be associated with each function associated with the graphic elements combined. In an exemplary embodiment, the method may further include providing information defining the stored graphic element and the function associated therewith to another device at operation 160.

In an exemplary embodiment, an apparatus for performing the method of FIG. 6 above may comprise a processor (e.g., the processor 52) configured to perform some or each of the operations (100-160) described above. The processor may, for example, be configured to perform the operations (100-160) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-160 may comprise, for example, the processor 52 (e.g., as means for performing any of the operations described above), the input analyzer 62 (e.g., as means for receiving a drawing input at a touch screen display and determining whether the drawing input corresponds to a stored graphic element), the initiator 64 (e.g., as means for initiating the function in response to determining that the drawing input corresponds to the stored graphic element), the learning component 66 (e.g., as means for performing operations 130-150), and/or an algorithm executed by the processor 52 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a drawing input at a touch screen display;
   determining whether the drawing input corresponds to a stored graphic element, the stored graphic element being associated with a function that is configured to execute at least one of an application or service;
   initiating the function in response to determining that the drawing input corresponds to the stored graphic element; and
   associating, in response to determining that the drawing input does not correspond to the stored graphic element, a candidate function of a plurality of candidate functions with the drawing input to enable execution of the selected candidate function in response to a future recognition of a drawing corresponding to a graphic element stored matching the drawing input.

2. The method of claim 1, further comprising causing the plurality of candidate functions to be provided in response to determining that the drawing input does not correspond to the stored graphic element.

3. The method of claim 2, further comprising receiving a selection of one of the candidate functions.

4. The method of claim 1, further comprising causing information defining the stored graphic element and the function associated therewith to be provided to another device.

5. The method of claim 1, further comprising defining an association between the drawing input and a user selected function in response to determining that the drawing input does not correspond to the stored graphic element.

6. The method of claim 1, further comprising causing a plurality of functions to be associated with a compound icon formed by combining at least two graphic elements, the compound icon being associated with each function associated with the at least two graphic elements.

7. A computer program product comprising:
   at least one computer-readable non-transitory storage medium having computer-program code stored thereon, the program code which when executed by an apparatus cause the apparatus at least to:
   receive a drawing input at a touch screen display;
   determine whether the drawing input corresponds to a stored graphic element, the stored graphic element being associated with a function that is configured to execute at least one or an application of service;
   initiate the function in response to determining that the drawing input corresponds to the stored graphic element; and
   associate, in response to determining that the drawing input does not correspond to the stored graphic element, a candidate function of a plurality of candidate functions with the drawing input to enable execution of the selected candidate function in response to a future recognition of a drawing corresponding to a graphic element stored matching the drawing input.

8. The computer program product of claim 7, further comprising program code instructions configured to cause the plurality of candidate functions to be provided in response to determining that the drawing input does not correspond to the stored graphic element.

9. The computer program product of claim 8, further comprising program code instructions configured to receive a selection of one of the candidate functions.

10. The computer program product of claim 7, further comprising program code instructions configured to cause information defining the stored graphic element and the function associated therewith to be provided to another device.

11. The computer program product of claim 7, further comprising program code instructions configured to define an association between the drawing input and a user selected function in response to determining that the drawing input does not correspond to the stored graphic element.

12. The computer program product of claim 7, further comprising program code instructions configured to cause a plurality of functions to be associated with a compound icon formed by combining at least two graphic elements, the compound icon being associated with each function associated with the at least two graphic elements.

13. An apparatus comprising:
a processor; and
a memory device including computer program code, the memory device and the computer program code configured to, with the processor, cause the apparatus to at least:
receive a drawing input at a touch screen display;
determine whether the drawing input corresponds to a stored graphic element, the stored graphic element being associated with a function that is configured to execute at least one of an application or service;
initiate the function in response to determining that the drawing input corresponds to the stored graphic element; and
associate, in response to determining that the drawing input does not correspond to the stored graphic element, a candidate function of a plurality of candidate functions with the drawing input to enable execution of the selected candidate function in response to a future recognition of a drawing corresponding to a graphic element stored matching the drawing input.

14. The apparatus of claim 13, wherein the memory device including the computer program code is further configured to, with the processor, cause the apparatus to cause the plurality of candidate functions to be provided in response to determining that the drawing input does not correspond to the stored graphic element.

15. The apparatus of claim 14, wherein the memory device including the computer program code is further configured to, with the processor, cause the apparatus to receive a selection of one of the candidate functions.

16. The apparatus of claim 13, wherein the memory device including the computer program code is further configured to, with the processor, cause the apparatus to cause information defining the stored graphic element and the function associated therewith to be provided to another device.

17. The apparatus of claim 13, wherein the memory device including the computer program code is further configured to, with the processor, cause the apparatus to define an association between the drawing input and a user selected function in response to determining that the drawing input does not correspond to the stored graphic element.

18. The apparatus of claim 13, wherein the memory device including the computer program code is further configured to, with the processor, cause the apparatus to cause a plurality of functions to be associated with a compound icon formed by combining at least two graphic elements, the compound icon being associated with each function associated with the at least two graphic elements.

19. An apparatus comprising:
means for receiving a drawing input at a touch screen display;
means for determining whether the drawing input corresponds to a stored graphic element, the stored graphic element being associated with a function that is configured to execute at least one of an application or service;
means for initiating the function in response to determining that the drawing input corresponds to the stored graphic element; and
means for associating, in response to determining that the drawing input does not correspond to the stored graphic element, a candidate function of a plurality of candidate functions with the drawing input to enable execution of the selected candidate function in response to a future recognition of a drawing corresponding to a graphic element stored matching the drawing input.

20. The apparatus of claim 19, further comprising means for causing the plurality of candidate functions to be provided in response to determining that the drawing input does not correspond to the stored graphic element.

* * * * *